June 3, 1930.  H. POPE  1,761,409
FASTENING DEVICE FOR PIPES OF IRRIGATION SYSTEMS
Filed April 26, 1928

Henry Pope
INVENTOR his ATTY.

Patented June 3, 1930

1,761,409

UNITED STATES PATENT OFFICE

HENRY POPE, OF CROYDON PARK, SOUTH AUSTRALIA, AUSTRALIA

FASTENING DEVICE FOR PIPES OF IRRIGATION SYSTEMS

Application filed April 26, 1928. Serial No. 272,971.

My invention relates to improvements in fastening devices for pipes of irrigation systems, the object of the same being to provide a fastening device which passes round a flexible ferrule which joins the ends of two lengths of tubing and is characterized by means for quickly tightening the band in place and for subsequently gradually adjusting the strain obtained by the quick fastening device.

In carrying my invention into effect I provide a band which is shorter than the external circumference of the surrounding ferrule and an abutment strip having upturned ends and a slotted intermediate length, the slotted link being of sufficient width to loosely accommodate the ends of the circumferential band, one upturned portion of the slotted link being adapted to engage an eccentric wedge or lock whilst the other end serves as an abutment for the head of a bolt or stud, there being a loop formed on the band which serves as an abutment for a nut.

But in order that by invention may be more clearly understood, I will now describe the same by aid of the accompanying illustrative drawings wherein:—

In each of the illustrations similar letters of reference are used to denote similar or corresponding parts wherever they occur.

Figure 1:
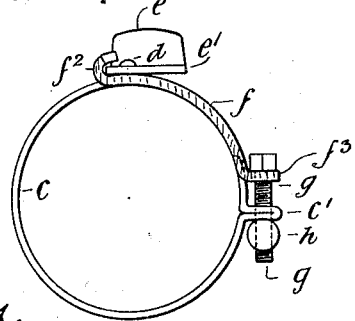
Fig. 1 is an end view of the complete device.
Figure 2:
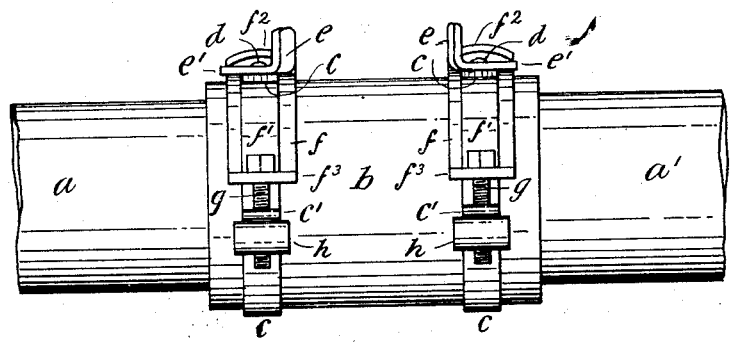
Fig. 2 is a side elevation showing the device applied to pipe ends and ferrule.

In the drawings $a$ and $a'$ represent the pipe ends of an irrigation system, said pipe ends being surrounded with a flexible rubber ferrule $b$ which fits neatly over the ends, but the ends of the pipes do not abut each other, a small space being left between them to provide a degree of resiliency in the pipe line.

The circumferential band is shown at $c$ and consists of a strip of metal which may for convenience be approximately three-eighths of an inch in width but does not completely surround the ferrule.

Near to one end of this band I form a crimp or bend $c'$, the metal being brought together as illustrated in Fig. 1 of the drawings, a hole being drilled through the centre of the crimped portion, whilst the opposite end is provided with a hinge pin or pivot $d$ upon which I mount the main locking element which consists of a strip of metal having an upturned edge $e$ which merges into a rounded base $e'$, said base being eccentrically mounted on the hinge pin or pivot and being provided with a straight bearing edge which extends on either side from opposite the centre of the rounded portion to the upturned edge.

In addition to these parts I provide a slotted link $f$ of more than sufficient length to make up the shortage in the circumferential band. This link, the slotted portion of which is shown at $f'$, is formed with an upwardly reverse bend $f^2$ at one end thereof, the opposite end being slightly upturned as shown at $f^3$.

When my device is applied to practical use the circumferential band is placed inside the slotted portion of the link so that the end which carries the main locking element protrudes above the circumferential band and lies adjacent to the end of the slotted link and through the opposite upturned end of the slotted link and the crimp $c'$ I insert a bolt or stud $g$ the head of which bears against the upturned portion of the link whilst the screw threaded shank engages the cross nut $h$ preferably made of round section brass for auxiliary adjustment purposes.

When the parts are assembled in the manner indicated the device is placed loosely round the flexible rubber ferrule $b$ and may be adjusted to some extent by means of the stud and nut, the main locking device being arranged in the position shown in Fig. 1 of the drawings.

Figure 3:
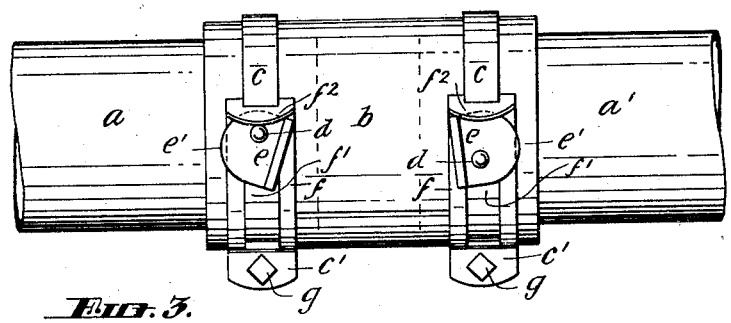
Fig. 3 is a plan of Fig. 2.
Figure 4:
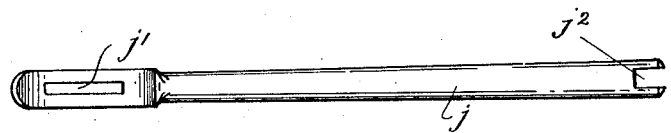
Fig. 4 is a key or lever for use in adjusting the operative parts.

In order to tighten the band it is only necessary for the operator to engage the upturned portion of the main locking device in the slot $j'$ of the lever $j$ which is provided for that purpose and to rotate it to the position indicated on the right hand side shown in Fig. 3, thus quickly tightening up the parts and any necessity to adjust undue strain or to take up excessive slackness is readily completed by rotating the stud $g$ backwards or forwards by the end of a key such as indicated at $j^2$ in Fig. 4 thus obtaining a perfect adjustment of the locking device, for it will be readily seen that the nut $h$ will bear against the crimp $c'$ which forms the necessary abutment incidental to the operation.

What I claim is:—

1. In improvements in fastening devices for pipes of irrigation systems, a circumferential band having a crimp or bend near one end, an eccentrically mounted rotatable locking and adjusting element on the opposite end, a link connecting the ends of the band and engaged at one end by said element to adjust the band with respect to the link, and to lock the link and band together, and means to adjustably connect the crimp and the other end of said link.

2. In improvements in fastening devices for pipes of irrigation systems, the combination of a circumferential band provided with an eccentrically mounted locking element and having an intermediate bend or crimp therein, a slotted link having outwardly deflected ends, an adjustment bolt supported within holes respectively formed in the slotted link and the crimped bend, and a nut which abuts against the crimped portion for adjusting the tension of the fastening.

3. In a clamping device of the character described, the combination of a separable circumferential band, a link between the ends of the band, and means for adjusting both ends of said band relatively to opposite ends of the link.

4. In a clamping device of the character described, the combination of a separable circumferential band, a link between the ends of the band, and separate means for adjusting the ends of the band relatively to opposite ends of the link.

5. In a clamping device of the character described, the combination of a circumferential band having a radially projecting crimp adjacent one end, a slotted link disposed between and adapted to receive the ends of the band in the slot, means adjustably connecting the crimp portion of the band with one end of the link, and further means on the other end of the band to engage the link to draw the band through the slot and thereafter to lock the link and band together.

In testimony whereof I affix my signature.

HENRY POPE.